United States Patent
Klausler

(10) Patent No.: US 9,544,226 B1
(45) Date of Patent: Jan. 10, 2017

(54) EFFICIENT ADDRESS-BASED RULE RESOLUTION IN A NETWORK EMPLOYING A BIT-MAPPED INDEX

(71) Applicant: Google Inc., Mountain View, CA (US)

(72) Inventor: Peter Michael Klausler, Middleton, WI (US)

(73) Assignee: Google Inc., Mountain View, CA (US)

(*) Notice: Subject to any disclaimer, the term of this patent is extended or adjusted under 35 U.S.C. 154(b) by 278 days.

(21) Appl. No.: 14/142,162

(22) Filed: Dec. 27, 2013

(51) Int. Cl.
| | |
|---|---|
| *H04L 12/741* | (2013.01) |
| *G06F 9/30* | (2006.01) |
| *H04L 12/743* | (2013.01) |
| *H04L 12/701* | (2013.01) |
| *H04L 12/745* | (2013.01) |

(52) U.S. Cl.
CPC .............. *H04L 45/74* (2013.01); *G06F 9/30* (2013.01); *G06F 9/30185* (2013.01); *H04L 45/00* (2013.01); *H04L 45/745* (2013.01); *H04L 45/748* (2013.01); *H04L 45/7457* (2013.01)

(58) Field of Classification Search
CPC .... H04L 45/748; H04L 45/00; H04L 45/7457; H04L 45/74; H04L 45/745; G06F 9/30; G06F 9/30185
See application file for complete search history.

(56) References Cited

U.S. PATENT DOCUMENTS

| | | | | |
|---|---|---|---|---|
| 6,804,767 | B1* | 10/2004 | Melvin | H04L 45/745 |
| | | | | 711/216 |
| 7,212,531 | B1* | 5/2007 | Kopelman | H04L 45/00 |
| | | | | 370/392 |
| 2006/0149853 | A1* | 7/2006 | Shankara | H04L 45/00 |
| | | | | 709/238 |
| 2013/0031077 | A1 | 1/2013 | Liu et al. | |
| 2014/0086248 | A1* | 3/2014 | Assarpour | H04L 45/748 |
| | | | | 370/392 |

OTHER PUBLICATIONS

Marko et al. "DXR: towards a billion lookups per second in software" ACM SIGCOMM computer communication review, vol. 42, No. 5. Oct. 2012.*

(Continued)

*Primary Examiner* — Ian N Moore
*Assistant Examiner* — Mewale Ambaye
(74) *Attorney, Agent, or Firm* — McDermott Will & Emery LLP

(57) ABSTRACT

Aspects and implementations of the present disclosure are directed to a network device. The network device includes memory for storing a first dataset comprising first data structures, a second dataset comprising second data structures, and a set of Boolean values. Each first data structure includes an address and a corresponding instruction parameter. Each second data structure includes an address prefix and at least one intermediary value. Each Boolean value corresponds to a respective address prefix and indicates whether the second dataset includes a second data structure with the respective address prefix. The network device is configured to identify a first address and a first address prefix for a first data packet, identify one or more intermediary values for the first address prefix using the set of Boolean values, and identify a packet processing instruction parameter using the one or more identified intermediary values.

18 Claims, 7 Drawing Sheets

(56) References Cited

OTHER PUBLICATIONS

Eatherton, et al., Tree Bitmap: Hardware/Software IP Lookups with Incremental Updates, ACM SIGCOMM Computer Communications Review, vol. 34, No. 2, Apr. 2004.
Lu, et al., O(log n) Dynamic Router-Tables for Prefixes and Ranges, IEEE Transactions on Computers, vol. 53, No. 10, Oct. 2004.
Waldvogel, et al., Scalable High Speed IP Routing Lookups, ACM SIGGCOM Computer Communication Review, vol. 27, Issue 4, Oct. 1997.
Zec, et al., DXR: Towards a Billion Routing Lookups per Second in Software, ACM SIGCOMM Computer Communication Review, vol. 42, No. 5, Oct. 2012.

* cited by examiner

EFFICIENT ADDRESS-BASED RULE RESOLUTION IN A NETWORK EMPLOYING A BIT-MAPPED INDEX

BACKGROUND

Network devices generally process data packets based on address information associated with the data packets. For example, a router typically forwards a received data packet to a next network destination (a "next-hop") based on an address associated with the data packet, e.g., a destination address indicated in header information for the received data packet. In general, the router identifies a next-hop address (or network interface connected thereto) by identifying a next-hop for the address associated with the data packet using a routing table or forwarding information base ("FIB"). Identification of the next-hop may be memory and/or processor intensive, and may benefit from special purpose hardware.

SUMMARY

In one aspect, the disclosure relates to a network device. The network device includes memory for storing a first dataset comprising first data structures, a second dataset comprising second data structures, and a set of Boolean values. Each first data structure includes an address and a corresponding instruction parameter. Each second data structure includes an address prefix and at least one intermediary value. The first data structures are organized in the first dataset ordered by address and the second data structures are organized in the second dataset ordered by address prefix. Each Boolean value corresponds to a respective address prefix and indicates whether the second dataset includes a second data structure with the respective address prefix. The network device includes at least one computing processor configured to identify a first address and a first address prefix for a first data packet, identify one or more intermediary values for the first address prefix using the set of Boolean values, and identify an instruction parameter using the one or more identified intermediary values. The at least one computing processor is configured to process the first data packet using the identified instruction parameter.

In one aspect, the disclosure relates to a method. The method includes storing, in computer readable memory, a first dataset comprising first data structures, a second dataset comprising second data structures, and a set of Boolean values. Each first data structure includes an address and a corresponding instruction parameter. Each second data structure includes an address prefix and at least one intermediary value. The first data structures are organized in the first dataset ordered by address and the second data structures are organized in the second dataset ordered by address prefix. Each Boolean value corresponds to a respective address prefix and indicates whether the second dataset includes a second data structure with the respective address prefix. The method includes identifying, by at least one computing processor, a first address and a first address prefix for a first data packet, identifying one or more intermediary values for the first address prefix using the set of Boolean values, and identifying an instruction parameter using the one or more identified intermediary values. The method includes processing, by at least one computing processor, the first data packet using the identified instruction parameter.

In one aspect, the disclosure relates to tangible computer readable storage media storing non-transient processor-executable instructions that, when executed by a computing device comprising the storage media and one or more processors, cause the one or more processors to perform the operations of storing, in computer readable memory, a first dataset comprising first data structures, a second dataset comprising second data structures, and a set of Boolean values. Each first data structure includes an address and a corresponding instruction parameter. Each second data structure includes an address prefix and at least one intermediary value. The first data structures are organized in the first dataset ordered by address and the second data structures are organized in the second dataset ordered by address prefix. Each Boolean value corresponds to a respective address prefix and indicates whether the second dataset includes a second data structure with the respective address prefix. The instructions further cause the one or more processors to identify a first address and a first address prefix for a first data packet, identify one or more intermediary values for the first address prefix using the set of Boolean values, and identify an instruction parameter using the one or more identified intermediary values. The instructions cause the one or more processors to process the first data packet using the identified instruction parameter.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Aspects and implementations of the present disclosure generally relate to indexing a network address table. The described systems and methods create and use a bit-mapped index into an address table, which provides routes, rules, or other processing instructions. To locate an instruction for a particular subject address, a network device (or other user) parses the subject address and identifies a prefix portion (e.g., the first 24 bits of a 32-bit address). The prefix portion is then used to step through one or more data structures and identify the specified route, rule, or other processing instruction for the subject address. The data structures are highly compressed and can, in some implementations, fit in cache on general purpose computing hardware. Although the examples used herein are 32-bit network addresses, the underlying logic applies to any size address (e.g., a 48-bit MAC address or a 128-bit IPv6 address) and can be used in non-network contexts such as memory addressing. Similarly, while described using 24-bit address prefixes, any number of bits can be used without departing from the scope of this disclosure.

Figure 1:
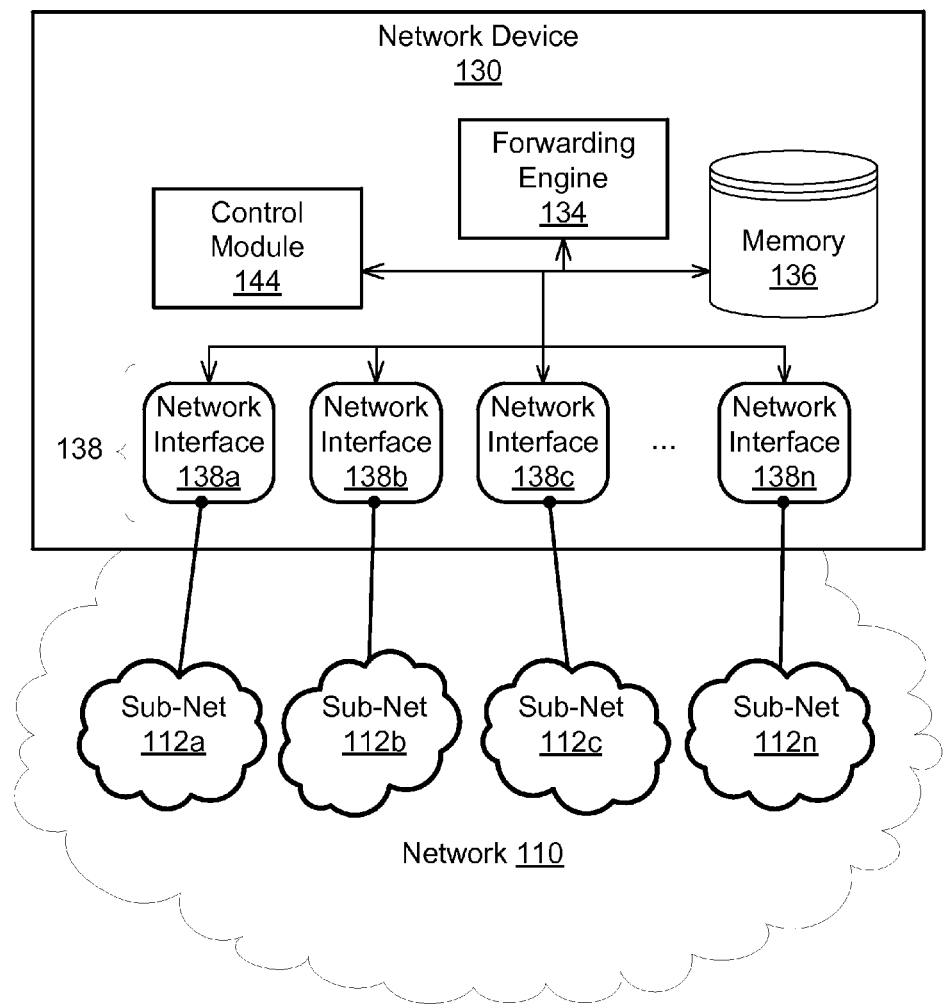
FIG. 1 is a block diagram of an example network device.

FIG. 1 is a block diagram of an example network device. In broad overview, the illustrated network device 130 has a control module 144 and a forwarding engine 134. The control module maintains the aforementioned data structures in a memory 136 for use by the forwarding engine 134 in processing data packets. The network device 130 has a plurality of network interfaces 138, with one or more of the network interfaces 138a-138n linked to other network devices in various sub-nets 112a-112n of a data network 110.

In more detail, the network device 130 participates in the data network 110 by receiving and sending data packets via the network interfaces 138. Each network interface 138 may be connected to other network devices, e.g., via a data plane. In some implementations, the connections are bi-directional data links. In some implementations, the connections are uni-directional data links, where each link is either ingress or egress. The other network devices send data packets to the network device 130, which may then forward them to another network device according to its configuration (e.g. rules or routing information stored in memory 136). For example, a data packet may arrive at the network device 130 via a first interface (e.g., network interface 138a), causing the network device 130 to process the received data packet and (for example) forward it to an appropriate next-hop via a second interface (e.g., network interface 238b). The forwarding engine 134 determines which network interface 138 to use to forward each data packet received.

The data network 110 is a network facilitating interactions between computing devices. An illustrative example data network 110 is the Internet; however, other networks may be used. The data network 110 may be composed of multiple connected sub-networks 112a-112n. The data network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The data network 110 may be any type and/or form of data network and/or communication network. The data network 110 may be public, private, or a combination of public and private networks. In general, the data network 110 is used to convey information between computing devices, and the network device 130 facilitates this communication according to its configuration.

The network device 130 includes a control module 144 and memory 136 storing any configuration, rules, and/or routing data. In some implementations, the control module 144 is implemented as a special purpose circuit (e.g., an ASIC). In some implementations, the control module 144 is implemented as a set of computer executable instruction sets stored in computer accessible memory and executed by one or more computing processors. The network device control module 144 receives configuration and routing information and updates the configuration and routing data stored in memory 136. In some implementations, the control module 144 receives routing data from other network devices in the network 110, e.g., using ICMP or BGP messages. In some implementations, the control module 144 creates and maintains the data structures described herein, using the received routing data. In some implementations, the network device 130 participates in a software-defined network ("SDN") and the network device control module 144 receives configuration and routing information from an SDN controller, e.g., via a control plane. In some such implementations, the control module 144 receives the data structures described herein from an SDN controller. In general, the control module 144 stores these data structures in the memory 136. The forwarding engine 134 uses the configuration and routing data in memory 136 to manage the data traffic at the network interface ports 138.

The network device memory 136 may each be any device suitable for storing computer readable data. The memory 136 may be similar to the memory 670 or cache 675 illustrated in FIG. 6 and described below. Examples include, but are not limited to, semiconductor memory devices such as EPROM, EEPROM, SDRAM, and flash memory devices. A network device 130 may have any number of memory devices 136.

The forwarding engine 134 uses the configuration and routing data stored in memory 136 to manage the data traffic received at the network interface ports 138. In some implementations, the forwarding engine 134 is implemented as a special purpose circuit (e.g., an ASIC). In some implementations, the forwarding engine 134 is implemented as a set of computer executable instruction sets stored in computer accessible memory and executed by one or more computing processors. The forwarding engine 134 extracts address information from a data packet (e.g., an IP address from a packet header) and processes it to determine how to handle the data packet (e.g., whether to forward the data packet and/or which network interface 138 to use for forwarding the data packet) using the specialized data structures and methods described herein.

In some implementations, the data structures used by the forwarding engine 134, and stored in the memory device 136, may include all or part of a Result Table, which is a fully resolved longest-prefix match ("LPM") table mapping addresses to packet processing instruction parameters. The packet processing instruction parameters each indicate how to handle a packet associated with a respective address, e.g., a parameter for a destination addresses may be a next-hop address. The Result Table is sorted by address and is compressed by removing (or omitting) the second of any two contiguous entries with the same resulting packet processing instruction parameter. In some implementations, the result table is stored as a value array. The result table is described in more detail below in reference to FIGS. 2A and 2C.

In some implementations, the forwarding engine 134 also employs all or part of a Range Table, which, like the Result Table, may be stored in the memory device 136. The Range Table maps address prefixes (of a fixed number of bits, e.g., 24) to range table data. The range table data for an address prefix is used by the forwarding engine 134 to determine a packet processing instruction parameter for an address starting with that prefix. For example, with 32-bit addresses and 24-bit prefixes, there are $2^8$ (two-hundred fifty six) addresses for each prefix—the range table data for an address prefix indicates to the forwarding engine 134 how to determine instruction parameters for each of those two-hundred fifty six addresses. In some implementations, the range table data includes an index to an entry in the Result Table for a first address starting with the associated prefix and a range count of the number of entries in the Result Table with the associated prefix. The forwarding engine 134 can use this information to perform a directed search of the Result Table, e.g., using the index and range values to drive a binary search of just the addresses in the Result Table starting with the appropriate prefix. In some implementations, certain range counts indicate to the forwarding engine 134 to use an alternate search strategy. For example, a range count equal to the maximum possible range (e.g., 256 for 32-bit address and 24-bit prefixes) indicates that the index value plus the address suffix (the remaining bits in the address, after the prefix) will equal an index directly to the correct entry in the Result Table. In some implementations, an invalid range count or a range count of one indicates that the range table data includes the instruction parameter stored in the result table for the address prefix instead of an index into the Result Table. That is, when there is only one possible instruction parameter for any address with a particular prefix, that instruction parameter may be placed in the Range Table in lieu of an index value, and the forwarding engine 134 can skip the search of the Result Table. The Range Table is sorted by the address prefix and is compressed by removing (or omitting) the second of any two contiguous entries with the same range table data. The Range Table is described in more detail below, in reference to FIGS. 2A-2C.

In some implementations, the forwarding engine 134 also employs a set of Boolean values (e.g., a bit map), which may be stored in the memory device 136, where each possible prefix in the Range Table is represented by a single corresponding Boolean value (e.g., a bit in the bit map). For example, if the address prefixes in the Range Table are 24 bits long, the Boolean values can be represented by a bit map that includes $2^{24}$ bits. For every possible prefix N, the $N^{th}$ bit of the bit map is a Boolean value that, if True, indicates that the Range Table has a specific entry for the prefix N, and, if False, indicates that the prefix has been omitted from the Range Table. A prefix is omitted if a preceding prefix has the same range table data; therefore, the forwarding engine 134 can use the largest prefix value, less than the prefix N, specifically represented in the Range Table, to find the range table data for the prefix N. When using a 1 to indicate True, the sum of the bits leading up to the $N^{th}$ bit corresponds to the number of entries in the Range Table leading up to the entry for the prefix N. Thus, the sum of the "true" bits, including the $N^{th}$ bit, can be used to determine an index into the Range Table for prefix N. This is explained in more detail below, in reference to FIGS. 2A and 2B.

In some implementations, the data structures stored in memory device 136 may include a pre-computed array of helper data used to accelerate look-ups. In some implementations, the helper data includes pre-computed sums for portions of a bit map. In some implementations, the helper data includes a packet processing instruction parameter for one or more blocks of address prefixes that all resolve to the same instruction parameter. The helper data is described in more detail below, in reference to FIG. 2B.

The described Result Table, Range Table, bit map, and table of helper data can be represented in a compact manner and used to facilitate fast data look-ups. A forwarding engine 134 can identify an address in a data packet and use these data structures to rapidly identify a packet processing instruction parameter for that address, as described further below. Moreover, in some implementations, due to their compact natures, these data structures can be stored in cache memory of a general purpose processor; thereby eliminating or reducing the need for slower memory access events.

Figure 2A:
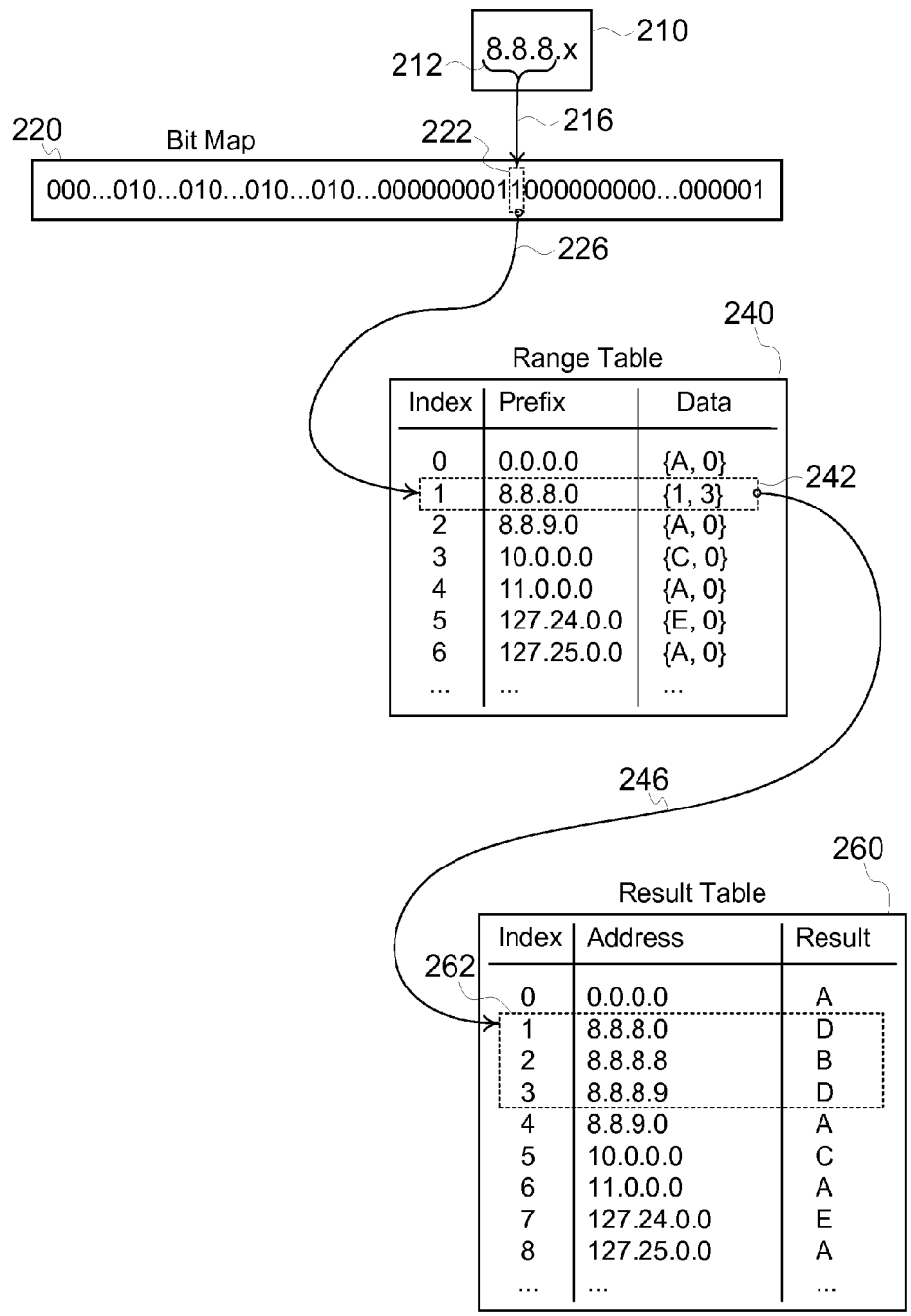
FIGS. 2A-2C are illustrations of relationships between example data-sets in tables.
Figure 2B:
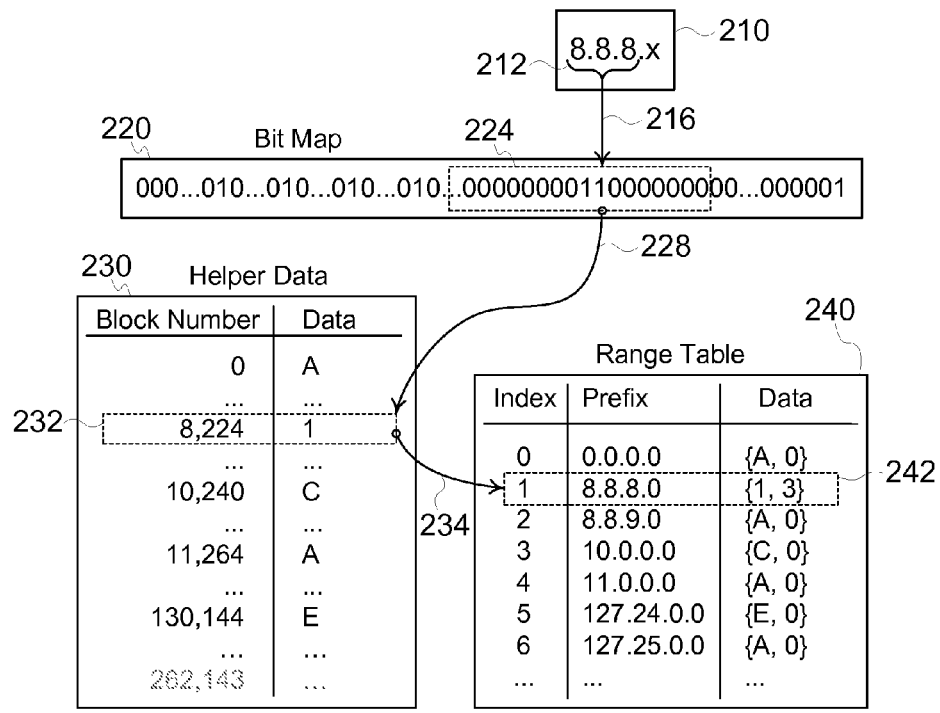
Figure 2C:
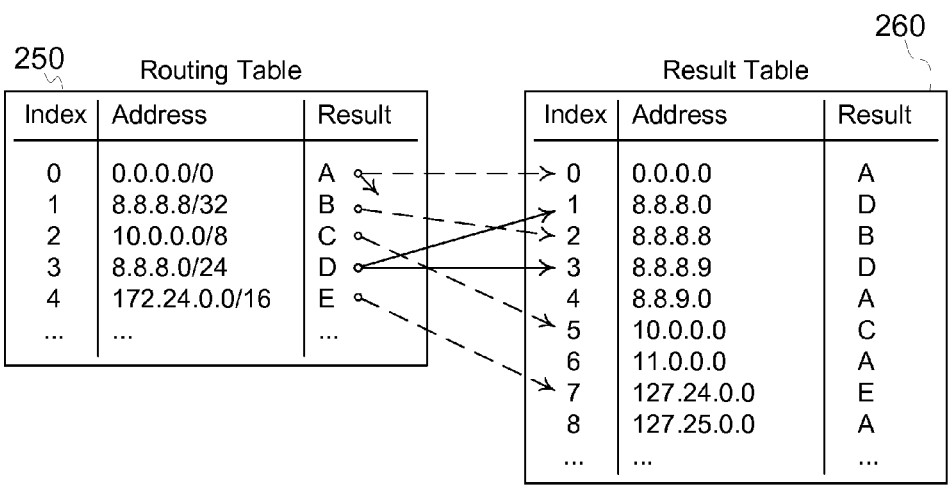

FIGS. 2A-2C are illustrations of relationships between the above described data structures using example data-sets. These examples use 32-bit network addresses and 24-bit address prefixes; however, the methods described can be used with addresses and prefixes having other numbers of bits (e.g., 48-bit MAC addresses or 128-bit IPv6 addresses). These examples result in a route identifier as a packet processing instruction parameter; however, similar data structures can be used to facilitate look-ups of other instruction parameters such as a Boolean value for allow/deny in a filtering process or a quality of service parameter to use in transmitting a data packet.

In broad overview, FIG. 2A depicts the use of a bit map 220, a range table 240, and a result table 260 to illustrate the identification of an instruction parameter (in these examples, a route identifier) for a data packet based on an address 210. FIG. 2B shows a helper data table 230, which is used in some implementations to expedite identification of the instruction parameter. FIG. 2C includes a routing table 250 and illustrates how the result table 260 is related to the routing table 250. FIGS. 2A-2C are now described in detail.

As indicated above, FIG. 2A illustrates identification of an instruction parameter for a subject address 210 based on an address prefix 212. An IPv4 network address is typically written as four 8-bit values in decimal form separated by periods (e.g., 4.3.2.1); however, the address is really a 32-bit number (e.g., $4.3.2.1=4\times2^{24}+3\times2^{16}+2\times2^{8}+1\times2^{0}=67,305,985$). An address prefix is the number represented by the leading bits of the address's binary representation. That is, a 24-bit address prefix is the number represented by the first 24-bits of an address. Thus the addresses in the range 8.8.8.0-8.8.8.255 all have a 24-bit prefix of 8.8.8. In practice, multiple devices in a sub-network are typically assigned network addresses with the same prefix, and routing schemes can leverage this practice. As illustrated in FIG. 2A, an address 210 has an address prefix 212, which is used to access a bit map 220.

The bit map 220 represents a set of Boolean values. Each bit in the bit map 220 indicates if an address prefix corresponding to the bit is specifically represented in the Range Table 240. The bit map 220 can be evaluated for a given address prefix to identify a Range Table entry corresponding to that prefix. The Range Table 240, as described below, is sorted by prefix address value and compressed by removing (or omitting) the second of any two contiguous entries with the same range table data. Therefore, an address prefix may be specifically represented in the Range Table 240, or it may have been removed during compression (or otherwise omitted) and is only inherently represented in the Range Table 240 by a lesser prefix value. The bit map 220 is arranged with the right-most (least significant) bit representing the Boolean value for the smallest address prefix (e.g., 0.0.0), the next bit (to the left) representing the Boolean value for the next address prefix (e.g., 0.0.1), and so forth. A one value ("1") is used in the bit map 220 to represent that a corresponding prefix address is specifically represented (that is, "true" that the prefix is present) in the Range Table 240, otherwise a zero value ("0") is used. Thus, the sum of the bits leading up to a particular bit equals the number of entries in the Range Table 240 leading up to the entry for an address prefix corresponding to that particular bit. In some implementations, the ordering of the bits is reversed. In some implementations, the meaning of a 1 or 0 bit is reversed.

As an example of use of the bit map 220, a network device 130 processing a data packet with the address 210 identifies the address prefix 212 and the corresponding bit 222, as illustrated by an arrow 216. The network device 130 then calculates the sum of the bits leading up to, and including, the bit 222 in the bit map 220, including the bit 222. In this example, the sum is two, which corresponds to the two entries in the Range Table 240 leading up to, and including, the entry 242 corresponding to the address prefix 212. The network device uses the sum to directly access the corresponding entry 242 in the Range Table 240, as illustrated by an arrow 226, obtaining an intermediary value "{1, 3}".

The Range Table 240 maps network address prefixes to range table data. In some implementations, the range table data for each entry is a pair of data that includes values for a Result Table index and a range-count. As introduced above, the index value identifies a first entry in the Result Table 260 for a particular address prefix, and the range-count value is a count of the number of entries in the Result Table 260 for the particular address prefix. An index value and range-count value can then be used to identify a specific set of entries in the Result Table 260 for addresses beginning with the particular address prefix.

In some implementations, the range table data for some of the range table entries includes an instruction parameter and a special indicator range-count that indicates that the particular range table data does not include an index value. For example, in some implementations, a range-count of one can only correspond to a single instruction parameter. Thus, the index value in the range table data for a corresponding range table index is replaced with that parameter value (thus {x, 1} means that x is a packet processing instruction parameter rather than an index value). In some implementations, an invalid range-count (such as zero) is used to indicate that the other value in the pair is an instruction parameter (thus {x, 0} means that x is a packet processing instruction parameter rather than an index value).

Accordingly, a network device 130 can access an entry in the Range Table 240 using the address prefix 212 and the bit map 220 to derive an index into the Range Table 240, as described above. The network device 130 can then obtain range table data from the Range Table 240 and then either use an instruction parameter if one is present in the range table data, or if an instruction parameter is not present, proceed to search the Result Table 260 for an instruction parameter based on the Result Table index and range-count values specified in the obtained range table data. For example, a network device 130 accesses the entry 242 (as described above) in the Range Table 240 and interprets the range table data "{1, 3}" to indicate that there are three entries in the Result Table 260, starting at index 1, for addresses with the address prefix "8.8.8" (such as the address prefix 212 for the subject address 210). The network device 130 then searches the indicated range 262 in the Result Table 260 for the specific address 210, as illustrated by an arrow 246. In some implementations, the search is a binary search. That is, in brief overview, the index and range-count values define a sorted set of possible Result Table entries that can be iteratively halved until the correct entry is identified. Thus, for example, the network device 130 may resolve an address 8.8.8.8 to an instruction parameter of "B" and an address of 8.8.8.12 to an instruction parameter of "D". The Result Table 260 is described in more detail below, in reference to FIG. 2C.

Referring now to FIG. 2B, in some implementations, the network device 130 stores an additional data structure (e.g., a table or an array) holding helper data 230. In some implementations, the helper data 230 is used to accelerate calculation of sums of bits in the bit map 220. The bit map 220 may be divided into contiguous blocks of bits (e.g., divided into word-sized blocks aligned on hardware register boundaries). To accelerate summing the bits up to a location in the bit map, a subtotal for each block of the bit map is pre-computed and stored as helper information. For bits in the $N^{th}$ block of the bit map, the $N^{th}$ entry in the pre-computed array of helper information is the sum of the bits leading up to (but not including) that block. The count for any location in the bit map can thus be determined by reading that location's block in the bit map, summing the bits in that block up to the location, and adding this sum to the pre-computed subtotal leading up to the block stored in the helper data 230. In some implementations, the first block of the bit map is not represented in the helper data. In some implementations, the pre-computed sum stored in the helper data for a block includes a sum of the bits in that block and, instead of adding to the pre-computed sum, a bit-count is subtracted from the pre-computed sum.

FIG. 2B depicts an example in which the helper data table 230 represents helper data for 64-bit blocks of the bit map 220. However, the blocks can be any size. In some implementations, the block size corresponds to a computing architecture's register size; choosing a block size equal to the register "word" size facilitates single-instruction processing of a block. For example, sixty four corresponds to the register size of a 64-bit processor architecture in some current computing devices. The address prefix "8.8.8" corresponds to the $526,344^{th}$ bit (starting at 0) of the bit map 220. The $526,344^{th}$ bit is in the $8,224^{th}$ 64-bit block (starting at 0) of the bit map 220. The least significant bits of the $8,224^{th}$ 64-bit block 224 are "0001 1000 0000," where the two 1s are the $526,345^{th}$ and $526,344^{th}$ bits of the bit map 220. The $8,224^{th}$ block 224 corresponds to an entry 232 in the helper data 230. The entry 232 has the sum of the bits leading up to the $8,224^{th}$ 64-bit block, which in this example is 1. Thus, the network device 130 can calculate the sum of the bits leading up to, and including, the bit 222 corresponding to the address prefix "8.8.8" in the bit map 220 by calculating the sum of the bits in the block 224 leading up to the bit 222 (which is the hamming weight of the series of bits from the subject bit 222 to the block boundary) and adding this sum to the helper data value, resulting in a total of 2. The network device 130 then uses this sum, 2, to access the second entry 242 in the Range Table 240, as described above. Likewise, the network device 130 can calculate the sum of the bits leading up to, and including, the bit corresponding to the address prefix "8.8.9" in the bit map 220 by calculating the sum of the bits in the block 224 leading up to the bit (the $526,345^{th}$ bit) and adding this sum (2) to the helper data value (1), resulting in a total of 3. The network device 130 then uses this sum, 3, to access the third entry in the Range Table 240. The result listed in the third entry is {A, 0}. As described above, a range-count of 0 can indicate that the first value (in this case, "A") in the range table data is an instruction parameter, rather than an index, and no further search of the Result Table is necessary. Thus, in this example, the packet processing instruction parameter for all addresses with the prefix "8.8.9" is indicated as "A."

In some implementations, the helper data 230 is used to provide a short-cut to an instruction parameter under special circumstances. For example, where all of bits in a block of the bit map 220 would resolve to the same entry in the Result Table 260, the sub-total value in the helper data 230 may be replaced with the instruction parameter for that entry in the Result Table 260. For example, every address prefix less than "8.8.8" illustrated in FIGS. 2A-2C resolves to the "A" parameter. In some implementations, each entry in the helper data 230 is either a pre-computed sum or an instruction parameter. In these implementations, if a block of bits in the Bit Map has, itself, the numeric value of zero or one, then the helper data for that block of bits is an instruction parameter, rather than a pre-computed sum of precedent bits. In practice, many of the entries in the helper data may benefit from this alteration, leading to even faster and more efficient address-to-parameter translation.

Referring now to FIG. 2C, the example Result Table 260 discussed above is an expanded form of an example routing table 250. Routing tables are typically expressed in Classless Inter-Domain Routing ("CIDR") notation. CIDR notation identifies an address range by an address prefix of a specified number of bits. The notation is a sub-net address followed by a delimiter (a slash mark) and the number of relevant bits in the sub-net address to specify an address prefix common to addresses in the address range. CIDR notation allows for specification of broad address ranges (e.g., 8.8.8.0/24) and specification of narrower sub-sets of the broad address ranges (e.g., 8.8.8.8/32). To match a subject address to a rule entry in a routing table, a routing engine (e.g., the forwarding engine 134) identifies the longest sub-net prefix that matches the leading bits of the subject address. This is referred to as a longest prefix match ("LPM"). Thus, as an example using the illustrated routing table 250, a subject address of 8.8.8.9 has the prefix 8.8.8.0/24 but not 8.8.8.8/32 and thus resolves to "D," whereas a subject address of 8.8.8.8 has the prefix 8.8.8.0/24 but also the longer prefix 8.8.8.8/32 and thus resolves to "B". The result table values are parameters for packet processing instructions to be performed by a network device 130. For example, in a routing table, the result may be a network interface identifier or network address for forwarding a packet to a next-hop in a route.

The Routing Table 250 can be expanded into the Result Table 260 by fully resolving every possible address in an address-to-result map, sorting by address, and removing or omitting the second of any two contiguous entries that map to the same value. For example, every address from 0.0.0.0 to 8.8.7.255 maps to "A" in the result table 260. The Result Table 260 represents the same information represented by the Routing Table 250, but in a different format. Different search procedures leverage aspects of the table formats. For example, a binary search requires the keys searched to be sorted. The Result Table 250 is sorted by address, facilitating binary searches of the addresses.

Figure 3:
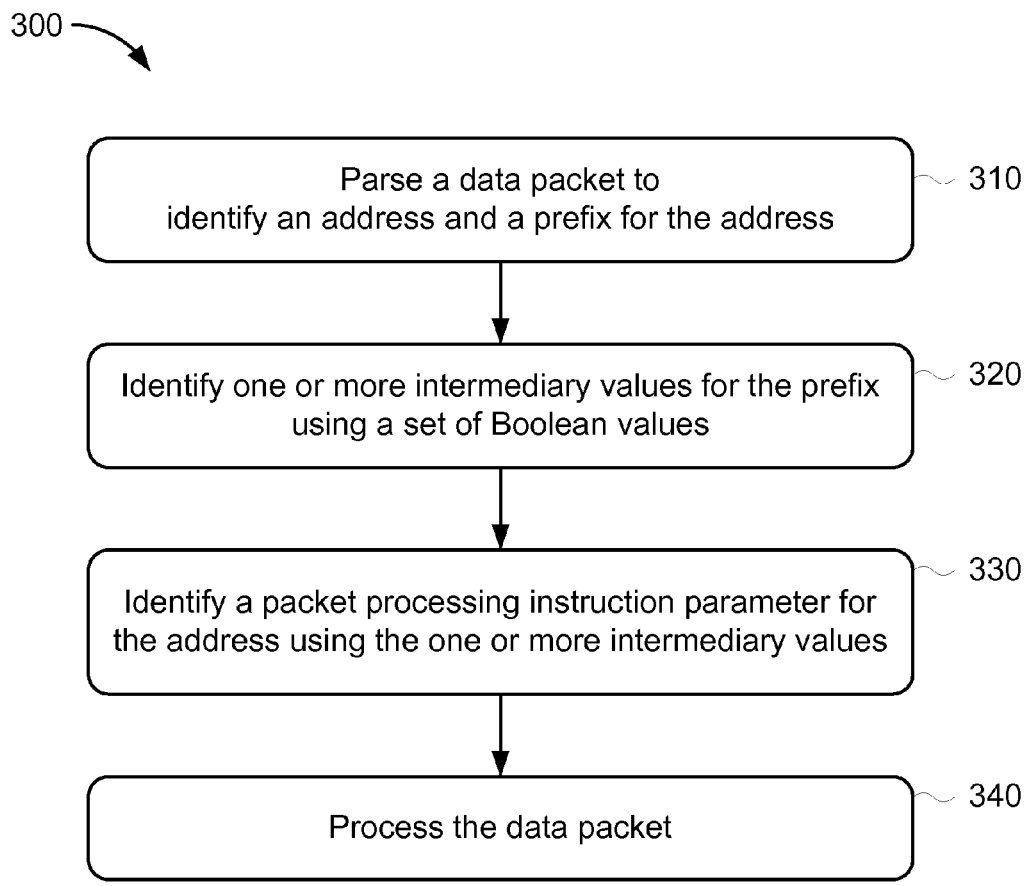
FIG. 3 is a flowchart for an example method in which a network device identifies an instruction parameter for an address.

FIG. 3 is a flowchart for a method 300 in which a network device identifies an instruction parameter based on a network address. In broad overview, the method 300 begins with a network device parsing a data packet to identify an address and a prefix for the address (stage 310). The network device then identifies one or more intermediary values for the address prefix using a set of Boolean values (stage 320). The network device identifies a packet processing instruction parameter for the address using the one or more intermediary values (stage 330) and processes the data packet (stage 340).

In more detail, in the method 300 begins with a network device (e.g., the network device 130 illustrated in FIG. 1) parsing a data packet to identify an address and a prefix for the address (stage 310). In some implementations, the network device is a router and the address is a destination indicated in a data packet header. In some implementations, the network device is a filter and the address is a source indicated in a data packet header. In some implementations, a packet processing engine in the network device parses the received data packet. The address prefix is a predetermined number of most-significant bits in the address. In some implementations, the address prefix is twenty-four bits, as illustrated in FIG. 2A.

Figure 4A:
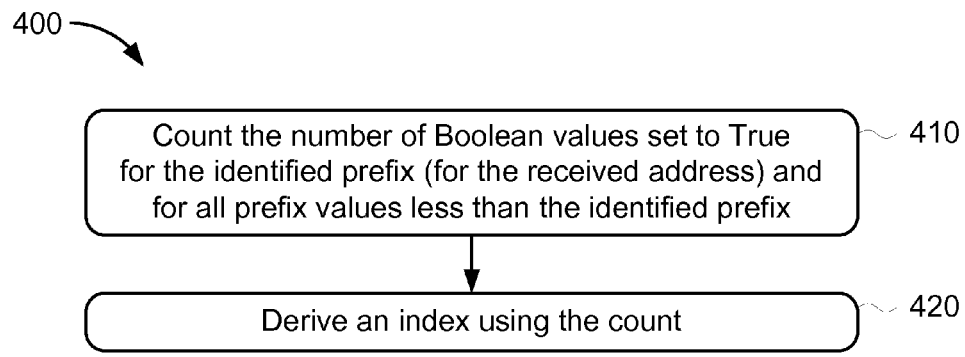
FIG. 4A is a flowchart for an example method in which a network device identifies an index value for use in identifying an instruction parameter for an address.
Figure 4B:
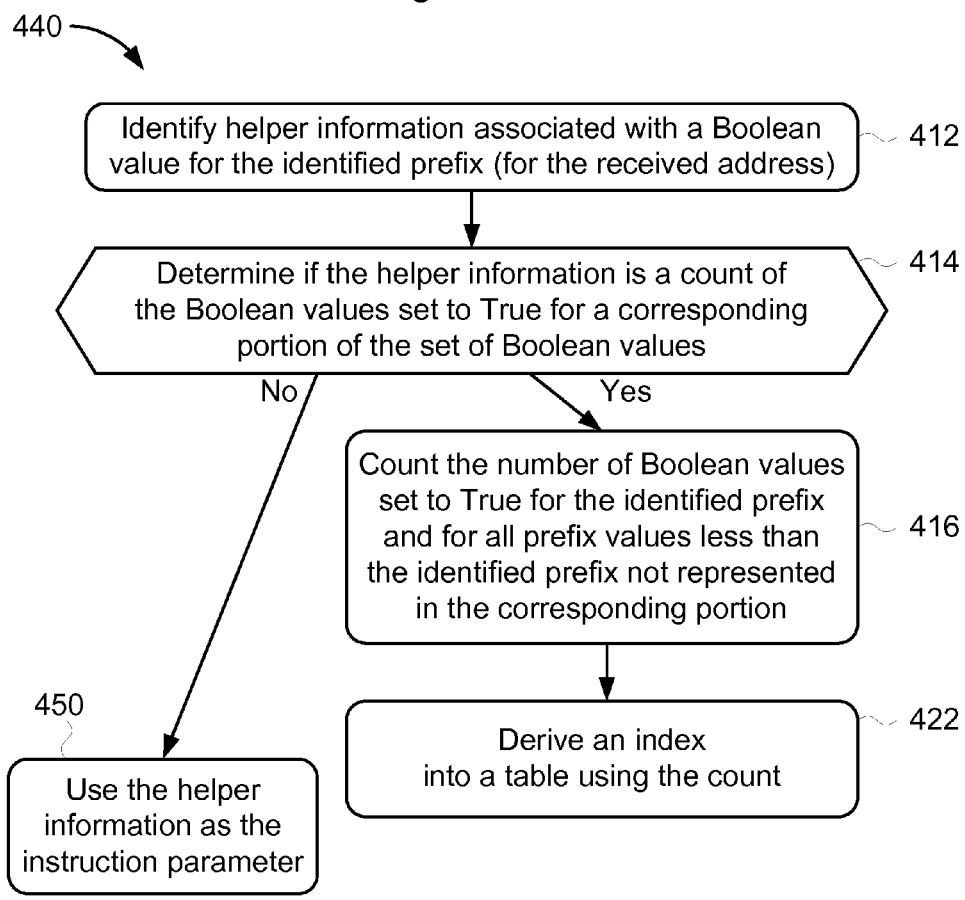
FIG. 4B is a flowchart for an example method in which a network device identifies an index value for use in identifying an instruction parameter for an address.

The network device then identifies one or more intermediary values associated with the address prefix using a set of Boolean values (stage 320). As introduced above, in FIG. 2A, in some implementations, a bit map 220 is used as the set of Boolean values. The network device identifies which bit 222 corresponds to the address prefix 212 and the sum of the bits leading up to the identified bit 222. This sum is an intermediary value associated with the address prefix. In some implementations, the network device accesses a Range Table 240, using an index into the Range Table 240 derived from the sum, to obtain range table data associated with the address prefix. In some implementations, the one or more intermediary values may include the range table data. In some implementations, the range table data is a pair of data items and the one or more intermediary values may include one or both of these data items. In some implementations, as shown in FIG. 2B, the network device uses helper data 230 to accelerate calculating the sum of the bits leading up to the identified bit 222. In some such implementations, if the identified bit 222 is in a block of bits all set to 0, or with only the least significant bit set to 1, the value of the block of bits is itself an intermediary value indicating that the helper data contains the result table value. The block of bits has a numeric value of zero when all the bits are set to 0 and a numeric value of one when only the least significant bit is set to 1. Thus, in some implementations, the Range Table is only accessed when the numeric value of the block of bits is not zero or one. That is, in some implementations, the block of bits itself can be one of the one or more intermediary values. FIGS. 4A and 4B, described below, illustrate example methods that use the set of Boolean values in this manner.

Figure 5:
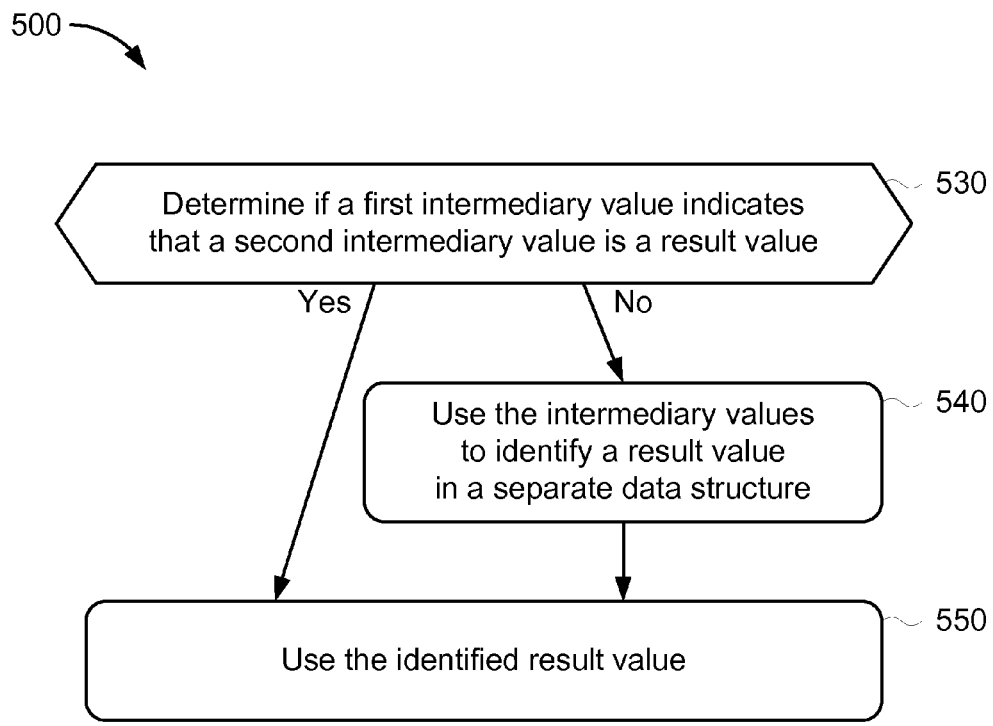
FIG. 5 is a flowchart for an example method in which a network device identifies an instruction parameter for the address using one or more intermediary values.

The network device uses the identified one or more intermediary values to identify a packet processing instruction parameter for the address (stage 330). In some implementations, one of the one or more intermediary values indicates to the network device that another one of the one or more intermediary values is the packet processing instruction parameter. FIG. 5, described below, illustrates an example method of identifying an instruction parameter for the address using the one or more intermediary values.

The network device can then process the data packet, using the identified packet processing instruction parameter (stage 340). In some implementations, the instruction parameter may be a next-hop address, a network interface identifier, or any other input parameter for a packet processing function. The network device then uses instruction parameter to process the data packet, for example, by forwarding the packet to the next hop address or transmitting the packet using the identified network interface.

FIG. 4A is a flowchart for a method 400 in which a network device identifies one or more intermediary values for an address prefix using a set of Boolean values (see stage 320, described above). In broad overview, the network device counts the number of Boolean values set to True for an identified address prefix and for all address prefix values less than the identified address prefix (stage 410). The network device then uses the count to derive an index into a separate data structure (e.g., a Range Table) and obtains one or more intermediary values (stage 420).

In more detail, the network device counts the number of Boolean values set to True for an identified address prefix and for all address prefix values less than the identified address prefix (stage 410). In some implementations, the Boolean values are stored as a series of bits, i.e., as a bit map (e.g., the bit map 220 illustrated in FIGS. 2A and 2B) where each bit is a 1 if a corresponding address prefix is specifically represented in a separate data structure (e.g., the Range Table 240, as illustrated in FIGS. 2A and 2B) and 0 otherwise. The sum of the bits (or, equivalently, the count of the bits with a true value) leading up to, and including, a bit corresponding to an address prefix is equal to the number of entries in the separate data structure (e.g., the Range Table 240) leading up to, and including, an entry corresponding to the address prefix.

The network device then derives an index into the separate data structure (e.g., the Range Table 240) using the count (stage 420). In some implementations with zero-based indexing, the index is equal to the sum minus one. That is, each bit counted represented an entry in the data structure. Therefore, the count is equal to the corresponding number of entries. With an index derived from the count in this manner, the network device can directly access the separate data structure at the correct location and obtain one or more intermediary values stored there. For example, the Range Table 240 stores range table data that may include a range-count, an index into a Result Table 260, or even (in some circumstances) the instruction parameter associated with the address. In some implementations, the index is a computer memory address.

In some implementations, optimizations facilitate shortcuts. FIG. 4B illustrates a method 440 of obtaining one or more intermediary values associated with an address prefix using the set of Boolean values. As introduced above, the Boolean values may be stored as a bit map divided into contiguous same-size blocks of bits. A network device may store helper data (e.g., the Helper Data 230 illustrated in FIG. 2B) that includes sub-totals of bit counts for each of the blocks. The count determined above, in stage 410, can be accelerated using these sub-totals. In some implementations, the block of bits is also, itself, an intermediary value associated with the address prefixes corresponding to the bits in the block. If the block has the value of 0, then all of the bits therein are zeros. If the block has the value of 1, then only the least significant bit therein is a one, and the rest of the bits therein are zeros. When all but the least significant bit of a block are zeros, every address prefix represented by the bits in the block will resolve to the same instruction parameter from the Result Table. Therefore, in some implementations, the helper data entry for such a block of bits is the instruction parameter itself. The value of the block of bits thus indicates whether the helper data for the block is a sub-total or an instruction parameter. In the method 440, the network device checks the value of the block of bits and uses this intermediary value to control how the helper data is used.

In broad overview of the method 440, the network device identifies helper information associated with a Boolean value for the identified address prefix (stage 412). The network device determines if the helper information is a count of the Boolean values set to True for a corresponding portion of the set of Booleans values (stage 414) and, if it is, counts the number of Boolean values set to True for the identified address prefix and for all prefix values less than the identified address prefix not represented in the corresponding portion (stage 416). The network device then uses the sum of the count and the helper information to derive an index into a set of indicator values (422). If the helper information is not a count (at stage 414), the network device uses the helper information itself as the instruction parameter (stage 450).

In more detail, the method 440 begins with the network device identifying helper information associated with a Boolean value for the identified address prefix (stage 412). As described above, in some implementations, the network device maintains a table of helper data (e.g., the helper data 230 illustrated in FIG. 2B). The helper data includes an entry for sets of contiguous bits of the bit map, e.g., by register or word size. In some implementations, some helper data entries are the sum of bits in the bit map leading up to a corresponding word of bits from the bit map, and some helper data entries contain other information useful in accelerating an address look-up under certain conditions. For example, in some implementations, the helper data is an instruction parameter when there is only one instruction parameter for all addresses with an address prefix corresponding to the helper data. In some implementations, to identify the helper information associated with a particular bit in a bit map, a network device identifies the bit's position in the bit map and divides this position by the size of the blocks. The network device then uses the result of this division to locate an entry in the helper data corresponding to the bit's block.

The network device determines if the helper information is a count of the Boolean values set to True for a corresponding portion of the set of Booleans values (stage 414). If the block of bits itself has the value of 0, then all of the bits therein are zeros. If the block has the value of 1, then only the least significant bit therein is a one, and the rest of the bits therein are zeros. When all but the least significant bit of a block are zeros, every address prefix represented by the bits in the block will resolve to the same instruction parameter from the Result Table. Therefore, in some implementations, the helper data entry for such a block of bits is the instruction parameter itself. Thus, the network device determines if the helper information is, or is not, an instruction parameter by checking the value of the block of bits from the bit map. If it is a value other than 1 or 0, then it is a sub-total of the Boolean values set to True for the bits in all of the lower-order blocks of the bit map.

If the helper information is a sub-total of the Boolean values set to True for the bits in all of the lower-order blocks of the bit map, then the network device counts the total number of Boolean values set to True for the identified prefix using this sub-total (stage 416). The network device counts the Boolean values set to True for the bit corresponding to the identified address prefix and for each lower-order bit within the block. The network device adds the sub-total from the helper information to this count and the sum is the count for the Boolean values set to True up to, and including, the Boolean value corresponding to the identified address prefix.

The network device then uses the sum of the count and the helper information to derive an index into a set of indicator values (422). This is equivalent to stage 420 in the method 400, described above. In some implementations, the index is a memory address in the Result Table.

If the helper information is not a count (at stage 414), the network device uses the helper information as the instruction parameter (stage 450). As described above, when there is only one entry in the Result Table for every address prefix represented by a block of the bit map, that instruction parameter may be stored in the helper information. Therefore, the network device can avoid any additional searching through the data structures if the instruction parameter is retrieved directly from the helper information.

FIG. 5 is a flowchart for an example method of identifying an instruction parameter for the address using the one or more intermediary values. In broad overview, the method 500 begins after the network device has obtained one or more intermediary values, e.g., the value of a block of bits in a bit map and/or range table data from a Range Table similar to the Range Table 240 illustrated in FIGS. 2A and 2B. The network device then determines if a first intermediary value indicates that a second intermediary value is an instruction parameter (stage 530). If not, the network device uses the one or more intermediary values to identify an instruction parameter in a separate data structure, e.g., in the Result Table (stage 540). The network device then uses the identified instruction parameter (stage 550).

In more detail, the method 500 begins with the network device determining if a first intermediary value indicates that a second intermediary value is an instruction parameter (stage 530). In some implementations, the first intermediary value is the value of a block of bits from the bit map and the second intermediary value is an entry in a table of helper data. If the block of bits has a numeric value of zero or one, then second intermediary value is an instruction parameter. Otherwise, the helper data is used to help access an intermediary Range Table, as described above. In some implementations, the first intermediary value is a "range-count" value obtained from the Range Table. In some implementations, an invalid range-count (either too small or too large) is an indicator that a second intermediary value in the Range Table is an instruction parameter. In some implementations, an range-count of 1 is an indicator that a second intermediary value in the Range Table is an instruction parameter. If the second intermediary value is an instruction parameter, the method 500 skips to stage 550.

Otherwise, the network device uses the one or more intermediary values to identify an instruction parameter in a separate data structure (stage 540). In some implementations, if the one or more intermediary values came from a bit map and helper data associated with the bit map, those intermediary values are used to access a Range Table. In some implementations, if the one or more intermediary values came from a Range Table, those intermediary values are used to access a Result Table. For example, range table data may include an index into a Result Table and a range-count of relevant entries in the Result Table. The index (a first intermediary value) and the range-count (a second intermediary value) are used by the network device to identify a set of entries in the Result Table to search within for the instruction parameter. In some implementations, this search is linear. In some implementations, this search is a binary search starting at an entry in the Result Table halfway between the index and the end of the set defined by the range-count. The network device identifies an address from an entry in the middle of the range and determines if the subject address is higher or lower than the identified address. This divides the range in half. The network device continues dividing the range in half in this manner until an entry is located in the Result Table with an address matching the subject address. A match is an address that is less than or equal to the subject address, where the next entry is an address larger than the subject address.

In some implementations, when the range-count is equal to the maximum possible number of entries, the network device adds the least significant bits of the subject address to the index to directly access the correct entry in the Result Table. For example, a 24-bit prefix from a 32-bit address can map to up to 256 possible addresses. If the range-count is 256, the remaining least significant 8 bits of the address equals the difference between the first index and the correct entry. Thus no searching is necessary in this situation. In some implementations, when there is almost a maximum number of entries in the Result Table for an address prefix, the missing entries are resolved in the Result Table so as to facility this direct indexing.

The network device then uses the instruction parameter identified in either stage 530 or in stage 540 to process a data packet according to the address (stage 550).

As described above, these methods and data structures facilitate fast data look-ups. For example, a forwarding engine in a network device such as a router or switch can identify an address in a data packet and then rapidly identify a packet processing instruction parameter for that address, as described. In practice, most network addresses in an IPv4 routing table are in sub-nets defined by address prefixes of 24 bits or fewer. While a Result Table similar to the Result Table 260 illustrated in FIGS. 2A and 2C could have $2^{32}$ (over 4 billion) addresses, in practice, it typically has less than a million. In some implementations, where all of the addresses with a particular address prefix also have the same instruction parameter, the Range Table 240 lists that instruction parameter instead of an index into the Result Table 260. Furthermore, in some implementations, where all of the addresses within a particular range of address prefix values have the same instruction parameter, the Helper Data 230 may list that instruction parameter instead of a pre-computed sum. Thus a network device storing these data structures as an IPv4 forwarding information base ("FIB") can resolve a data-packet network address into a next-hop address with one to three direct memory access events.

Summing bits in the bit map 220 using the helper data 230 can also be done with very few instructions (e.g., shift or rotate, compute hamming weight using a population count instruction such as popcnt or SADD, shift bits to divide by a power of two, access a memory address, and add the hamming weight to the stored value). Even when the network device needs to access the Result Table 260, the access is limited to a defined range. In some implementations, when every address in that range is present in the Result Table 260 (that is, when the range-count is the maximum, e.g., 256 in the example illustrated in FIGS. 2A-2C), the network device 130 can use the address suffix to directly access the instruction parameter in the Result Table 260 without a search process. Thus address resolution may be significantly faster than searching a routing table 250 for a longest prefix match. Moreover, due to the compact nature of the data structures, in many cases they can be stored in their entirety in cache memory, which makes the memory access even faster.

Figure 6:
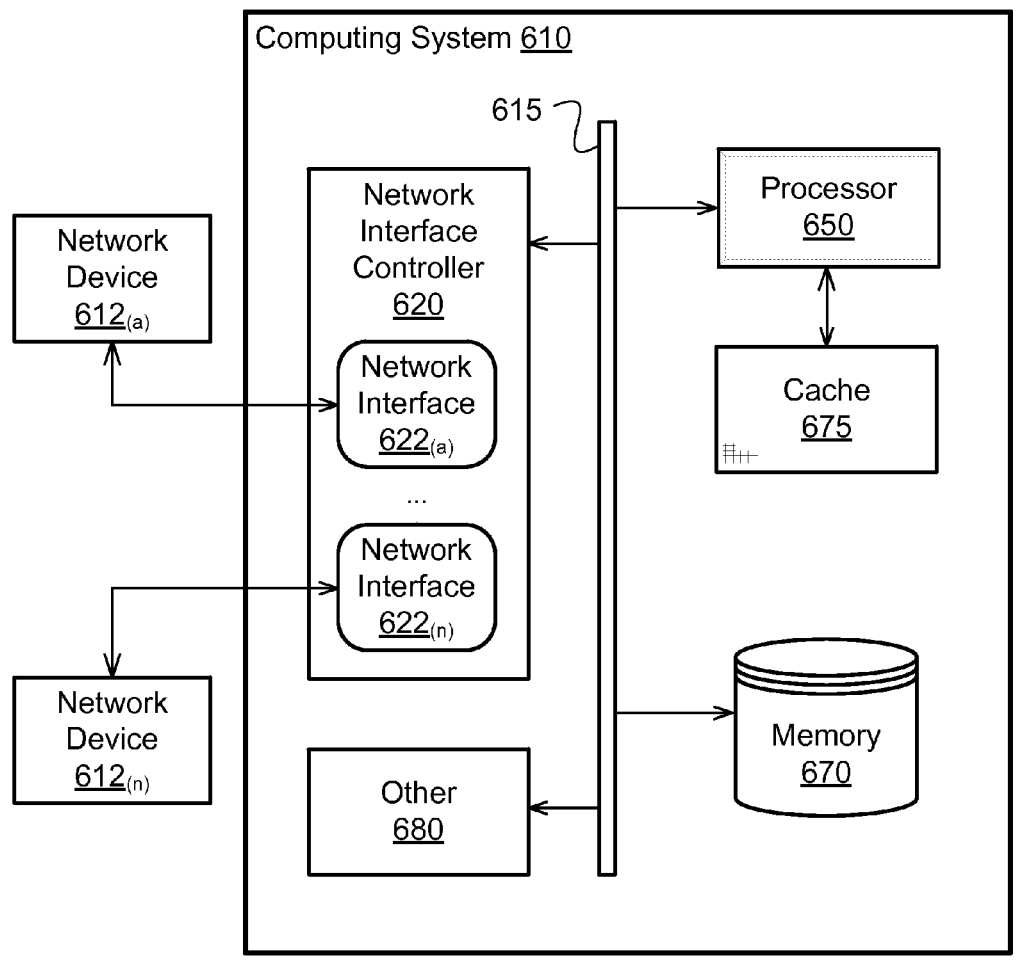
FIG. 6 is a block diagram of a computing system in accordance with an illustrative implementation.

FIG. 6 is a block diagram of a computing system for use in implementing the computerized components described herein, in accordance with an illustrative implementation. In broad overview, the computing system includes at least one processor 650 for performing actions in accordance with instructions and one or more memory devices 670 or 675 for storing instructions and data. The illustrated example computing system 610 includes one or more processors 650 in communication, via a bus 615, with at least one network interface controller 620 with network interfaces $622_{(a\text{-}n)}$ connecting to network devices $612_{(a\text{-}n)}$, memory 670, and any other devices 680, e.g., an I/O interface. Generally, a processor 650 will execute instructions received from memory. The processor 650 illustrated incorporates, or is directly connected to, cache memory 675.

In more detail, the processor 650 may be any logic circuitry that processes instructions, e.g., instructions fetched from the memory 670 or cache 675. In many embodiments, the processor 650 is a microprocessor unit or special purpose processor. The computing device 610 may be based on any processor, or set of processors, capable of operating as described herein. The processor 650 may be a single core or multi-core processor. The processor 650 may be multiple processors.

The memory 670 may be any device suitable for storing computer readable data. The memory 670 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 610 may have any number of memory devices 670.

The cache memory 675 is generally a form of computer memory placed in close proximity to the processor 650 for fast read times. In some implementations, the cache memory 675 is part of, or on the same chip as, the processor 650. In some implementations, there are multiple levels of cache 675, e.g., L2 and L3 cache layers.

The network interface controller 620 manages data exchanges via the network interfaces 622$_{(a-n)}$ (also referred to as network interface ports). The network interface controller 620 handles the physical and data link layers of the OSI model for network communication. In some implementations, some of the network interface controller's tasks are handled by the processor 650. In some implementations, the network interface controller 620 is part of the processor 650. In some implementations, a computing system 610 has multiple network interface controllers 620. The network interfaces 622$_{(a-n)}$ are connection points for physical network links. In some implementations, the network interface controller 620 supports wireless network connections and a network interface 622 is a wireless receiver/transmitter. Generally, a computing device 610 exchanges data with other computing devices 612$_{(a-n)}$ via physical or wireless links to a network interface 622$_{(a-n)}$. In some implementations, the network interface controller 620 implements a network protocol such as Ethernet.

The other computing devices 612$_{(a-n)}$ are connected to the computing device 610 via a network interface 622. The other computing devices 612$_{(a-n)}$ may be peer computing devices, network devices, or any other computing device with network functionality. For example, a first computing device 612$_{(a)}$ may be a network device such as a hub, a bridge, a switch, or a router, connecting the computing device 610 to a data network such as the Internet.

The other devices 680 may include an I/O interface, external serial device ports, and any additional co-processors. For example, a computing system 610 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 610 includes an additional device 680 such as a co-processor, e.g., a math co-processor can assist the processor 650 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A network device comprising:
a memory for storing information regarding a range of addresses, the stored information structured as:
  a first dataset comprising first data structures, each first data structure including a respective address in the range of addresses and a corresponding instruction parameter, wherein the first data structures are organized in the first dataset ordered by address;
  a second dataset comprising second data structures, each second data structure including at least one intermediary value corresponding to a respective address prefix, the at least one intermediary value representing information for use in identifying a respective instruction parameter for an address beginning with the respective address prefix; and
  a set of Boolean values, each Boolean value corresponding to a respective address prefix and indicating whether the second dataset includes a second data structure for the respective address prefix; and
at least one processor coupled to the memory configured to:
  identify a first address and a first address prefix for a first data packet;
  identify one or more intermediary values corresponding to the first address prefix using the set of Boolean values;
  identify an instruction parameter using the one or more identified intermediary values; and
  process the first data packet using the identified instruction parameter,
wherein at least one second data structure in the second data set includes:
  a first intermediary value that is a count of first data structures in the first dataset that each include an address beginning with the corresponding address prefix; and
  a second intermediary value that is an index into the first dataset for a first data structure that includes an address with the corresponding address prefix.

2. The network device of claim 1, wherein the identified instruction parameter is one of:
  a second address associated with a route to the first address;
  a network interface number;
  a network identifier;
  a rule for processing a packet associated with the first address;
  a Boolean value indicating whether to allow a data packet addressed from the first address; and
  a Boolean value indicating whether to allow a data packet addressed to the first address.

3. The network device of claim 1, the at least one processor configured to determine that the first intermediary value is equal to a predefined maximum possible quantity of first data structures that are capable of being in the first dataset affiliated with the corresponding address prefix and, in response, add a portion of the first address to the index.

4. The network device of claim 1, wherein at least one second data structure in the second data set includes:
  a first intermediary value indicating that the at least one second data structure includes an instruction parameter; and
  the instruction parameter.

5. The network device of claim 4, wherein the first intermediary value is outside a predefined range of possible valid counts of addresses beginning with the corresponding address prefix.

6. The network device of claim 1, wherein the memory for storing the first dataset, the second dataset, and the set of Boolean values is cache memory of the at least one processor.

7. The network device of claim 1, wherein the at least one processor is configured to count, in the set of Boolean values, a number of Boolean values corresponding to the first address prefix value, and to the address prefix values smaller than the first prefix value, that are set to a True value.

8. The network device of claim 7,
wherein the memory stores a set of helper information comprising a plurality of helper information entries, each helper information entry comprising one of:
  a count of the Boolean values set to a True value in a corresponding portion of the set of Boolean values; and
  an instruction parameter; and
wherein the at least one processor is configured to:
  count the number of the Boolean values corresponding to the first address prefix value, and to the address prefix values smaller than the first prefix value, that are set to a True value, using the helper information when the helper information comprises the count of the Boolean values set to a True value in the corresponding portion of the set of Boolean values; and
  identify the instruction parameter in the helper information when the helper information comprises the instruction parameter.

9. A network device packet processing method comprising:
storing, in computer readable memory accessible by at least one computing processor, information about a range of addresses, the stored information structured as:
  a first dataset comprising first data structures, each first data structure including a respective address in the range of addresses and a corresponding instruction parameter, the first data structures sorted in the first dataset by address;
  a second dataset comprising second data structures, each second data structure including at least one intermediary value corresponding to a respective address prefix, the at least one intermediary value representing information for use in identifying a respective instruction parameter for an address beginning with the respective address prefix; and
  a set of Boolean values, each Boolean value corresponding to a respective address prefix and indicating whether the second dataset includes a second data structure for the respective address prefix;

identifying, by the at least one computing processor, a first address and a first address prefix for a first data packet;

identifying, by the at least one computing processor, one or more intermediary values corresponding to the first address prefix using the set of Boolean values;

identifying, by the at least one computing processor, an instruction parameter using the one or more identified intermediary values; and processing, by the at least one computing processor, the first data packet using the identified instruction parameter, wherein at least one second data structure in the second data set includes:

a first intermediary value that is a count of first data structures in the first dataset that each include an address beginning with the corresponding address prefix; and a second intermediary value that is an index into the first dataset for a first data structure that includes an address with the corresponding address prefix.

10. The method of claim 9, wherein the identified instruction parameter is one of:

a second address associated with a route to the first address;

a network interface number;

a network identifier;

a rule for processing a packet associated with the first address;

a Boolean value indicating whether to allow a data packet addressed from the first address; and a Boolean value indicating whether to allow a data packet addressed to the first address.

11. The method of claim 10, the method further comprising determining, by the at least one computing processor, that the first intermediary value is equal to a predefined maximum possible quantity of first data structures that are capable of being in the first dataset affiliated with the corresponding address prefix and, in response, adding a portion of the first address to the index.

12. The method of claim 9, wherein at least one second data structure in the second data set includes:

a first intermediary value indicating that the at least one second data structure includes an instruction parameter; and the instruction parameter.

13. The method of claim 12, wherein the first intermediary value is outside a predefined range of possible valid counts of addresses beginning with the corresponding address prefix.

14. The method of claim 9, comprising storing the first dataset, the second dataset, and the set of Boolean values in a cache memory of the at least one computing processor.

15. The method of claim 9, the method comprising:

counting, by the at least one computing processor, in the set of Boolean values, a number of Boolean values corresponding to the first address prefix value, and to the address prefix values smaller than the first prefix value, that are set to a True value.

16. The method of claim 15, the method comprising:

storing, in the computer readable memory, a set of helper information comprising a plurality of helper information entries, each helper information entry comprising one of:

a count of the Boolean values set to a True value in a corresponding portion of the set of Boolean values; and an instruction parameter;

counting, by the at least one computing processor, the number of the Boolean values corresponding to the first address prefix value, and to the address prefix values smaller than the first prefix value, that are set to a True value, using the helper information when the helper information comprises the count of the Boolean values set to a True value in the corresponding portion of the set of Boolean values; and identifying, by the at least one computing processor, the instruction parameter in the helper information when the helper information comprises the instruction parameter.

17. Tangible non-transitory computer readable media storing instructions which, when executed by one or more computing processors, cause the one or more computing processors to:

access computer readable memory storing information regarding a range of addresses, the stored information structured as:

a first dataset comprising first data structures, each first data structure including a respective address in the range of addresses and a corresponding instruction parameter, wherein the first data structures are organized in the first dataset ordered by address;

a second dataset comprising second data structures, each second data structure including at least one intermediary value corresponding to a respective address prefix, the at least one intermediary value representing information for use in identifying a respective instruction parameter for an address beginning with the respective address prefix; and a set of Boolean values, each Boolean value corresponding to a respective address prefix and indicating whether the second dataset includes a second data structure for the respective address prefix;

identify a first address and a first address prefix for a first data packet;

identify one or more intermediary values corresponding to the first address prefix using the set of Boolean values;

identify an instruction parameter using the one or more identified intermediary values; and process the first data packet using the identified instruction parameter, wherein at least one second data structure in the second data set includes:

a first intermediary value that is a count of first data structures in the first dataset that each include an address beginning with the corresponding address prefix; and a second intermediary value that is an index into the first dataset for a first data structure that includes an address with the corresponding address prefix.

18. The computer readable media of claim 17, the instructions comprising instructions to cause the one or more processors to:

access computer readable memory storing a set of helper information comprising a plurality of helper information entries, each helper information entry comprising one of:

a count of the Boolean values set to a True value in a corresponding portion of the set of Boolean values; and an instruction parameter;

count the number of the Boolean values set to a True value for the first address prefix value, and for all address prefix values smaller than the first prefix value, using the helper information when the helper information comprises the count of the Boolean values set to a True value in the corresponding portion of the set of Boolean values; and identify the instruction parameter in the helper information when the helper information comprises the instruction parameter.

\* \* \* \* \*